United States Statutory Invention Registration [19]

[11] Reg. Number: H524

Weideman [43] Published: Sep. 6, 1988

[54] IMAGE PROCESSING SYSTEM FOR CONVERTING MONOCHROME BANK CHECK IMAGES TO MULTICOLOR BANK CHECK IMAGES

[75] Inventor: William E. Weideman, Arlington, Tex.

[73] Assignee: Recognition Equipment Inc., Irving, Tex.

[21] Appl. No.: 926,458

[22] Filed: Nov. 3, 1986

[51] Int. Cl.[4] ..... H04N 1/46; H04N 9/02; G09G 1/28

[52] U.S. Cl. ..... 358/81; 358/82; 340/701

[58] Field of Search ..... 358/81, 82; 340/703, 340/793, 701

[56] References Cited

U.S. PATENT DOCUMENTS

| | | | |
|---|---|---|---|
| 3,706,841 | 12/1972 | Novak | 358/82 |
| 3,710,011 | 1/1973 | Altemus et al. | 358/82 |
| 3,784,736 | 1/1974 | Novak | 358/81 |
| 3,849,793 | 11/1974 | Ablett | 358/81 |
| 3,911,418 | 10/1975 | Takeda | 340/324 AD |
| 4,183,046 | 1/1980 | Dalke et al. | 358/22 |
| 4,326,258 | 4/1982 | de la Guardia | 364/515 |
| 4,574,393 | 3/1986 | Blackwell et al. | 382/17 |

FOREIGN PATENT DOCUMENTS

| | | | |
|---|---|---|---|
| 2515908 | 5/1983 | France | 358/81 |
| 53-148229 | 12/1978 | Japan | 358/81 |

OTHER PUBLICATIONS

"A Simple Grey-Scale to Colour Converter" by R. P. Betts, Journal of Medical Engineering and Technology, vol. 3, No. 1, Jan. 1979.

J. Sheppard, Jr., et al. "Pseudocolor as a Means for Image Enhancement", *American Journal of Optometry, vol. 46, pp. 735-754 (1969).*

*Primary Examiner*—Stephen C. Buczinski
*Assistant Examiner*—Linda J. Wallace
*Attorney, Agent, or Firm*—Richards, Harris & Medlock & Andrews

[57] ABSTRACT

An image processing system (10) for displaying a video image of a document includes structure for scanning (12) the document and for generating (24) pixel signals representing gray level data values of the image of the document. Circuitry (80) generates a set of color data values and assigns one of the color data values to pixels having a predetermined gray level data value. Structure (42, 84) displays the pixels having an assigned color data value and generates a color image of the document.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IMAGE PROCESSING SYSTEM FOR CONVERTING MONOCHROME BANK CHECK IMAGES TO MULTICOLOR BANK CHECK IMAGES

TECHNICAL FIELD

This invention relates to image processing systems, and more particularly to the use of pseudocolor techniques in processing documents such as, for example, bank checks.

BACKGROUND OF THE INVENTION

Document processing systems optically read information from documents, such information may be stored if not used immediately for processing or subsequently displayed to an operator via a terminal or work station. Numerous processing systems may lift portions of the image of a document in order to retain certain fields of information of the document. Additionally, information on the document may be optically read for further processing of the document. In the course of such processing, the optical reading system may be unable to identify a portion of the information, and human intervention is necessary to perform the reading operation. This human intervention involves the displaying of the image of the document to an operator to assist in the recognition of a character or unidentified portion.

Information from a document may be found in layers, such as for example, on a bank check. The bottom layer can be considered the background or the artistic scene found on the front of a check. The next layer may comprise the printing on the check such as the imprinted address of the bank account holder, the bank identifying characters and the check amount field. An additional layer is the actual writing place on the check by the maker of the check. A further layer comprises any subsequent stamps or imprinting done by banks in the processing of the check. The usefulness of the concept of layers involved in processing an image of a bank check is more apparent when examining the images of the back of the bank check.

During processing of bank checks, various stamps are placed on the back of the check. The bottom layer of the image may be considered to be the background or safety pattern of the check. Each stamp found on the back of the check during processing can also be considered to be a separate layer. If each stamp or layer does not overlap, information from each layer is easy to discern as all of the information is found at a single location with no overlap on the back of the bank check. However, in many instances, the stamps will overlap, and it will be difficult to decipher the individual stamps necessary for processing of the bank check. If these overlapping layers could be viewed separately, the image processing systems could better discern the information found on the check from the image data.

Previous attempts to solve the problem of distinguishing between layers of information on a bank check have used a correlator or similar process to make a binary decision. This approach determines whether each picture element (pixel) contains useful information. Some difficulties experienced with this method include distinguishing between overlapping layers and working at an acceptable level on both low and high print contrast ratio images. An additional approach to this problem has been gray scale processing which assigns a different gray shade to each layer of information found on the document. However, gray scale processing presents a problem to an operator in distinguishing one shade from another. This problem becomes more severe when there are more than four shades of gray in the image since the human eye has difficulty in distinguishing between shades of gray.

A need has thus arisen for an image processing system for processing images of documents having multiple layers of information contained on the document. Such a system must assist a human operator in distinguishing between the layers of information so that the image can be readily viewed and recognized.

SUMMARY OF THE INVENTION

In accordance with the present invention, a pseudocolor image processing system is provided which substantially eliminates the problems heretofore associated with identifying and distinguishing various layers of information contained on a document.

In accordance with one aspect of the present invention, an image processing system for displaying a video image of a document or portion thereof is provided. The processing system includes structure for scanning the document and for generating pixel signals representing gray level data values of the image of the document. Circuitry is provided for generating color data values. The system further includes structure for assigning a color data value to pixels having a predetermined gray level data value. A display is provided for displaying the pixels having the preassigned color data value for generating a pseudocolor image of the document.

BRIEF DESCRIPTION OF THE DRAWINGS

For a more complete understanding of the present invention and for further advantages thereof, reference is now made to the following Detailed Description taken in conjunction with the accompanying Drawings in which.

DESCRIPTION OF THE PREFERRED EMBODIMENTS

Figure 1:
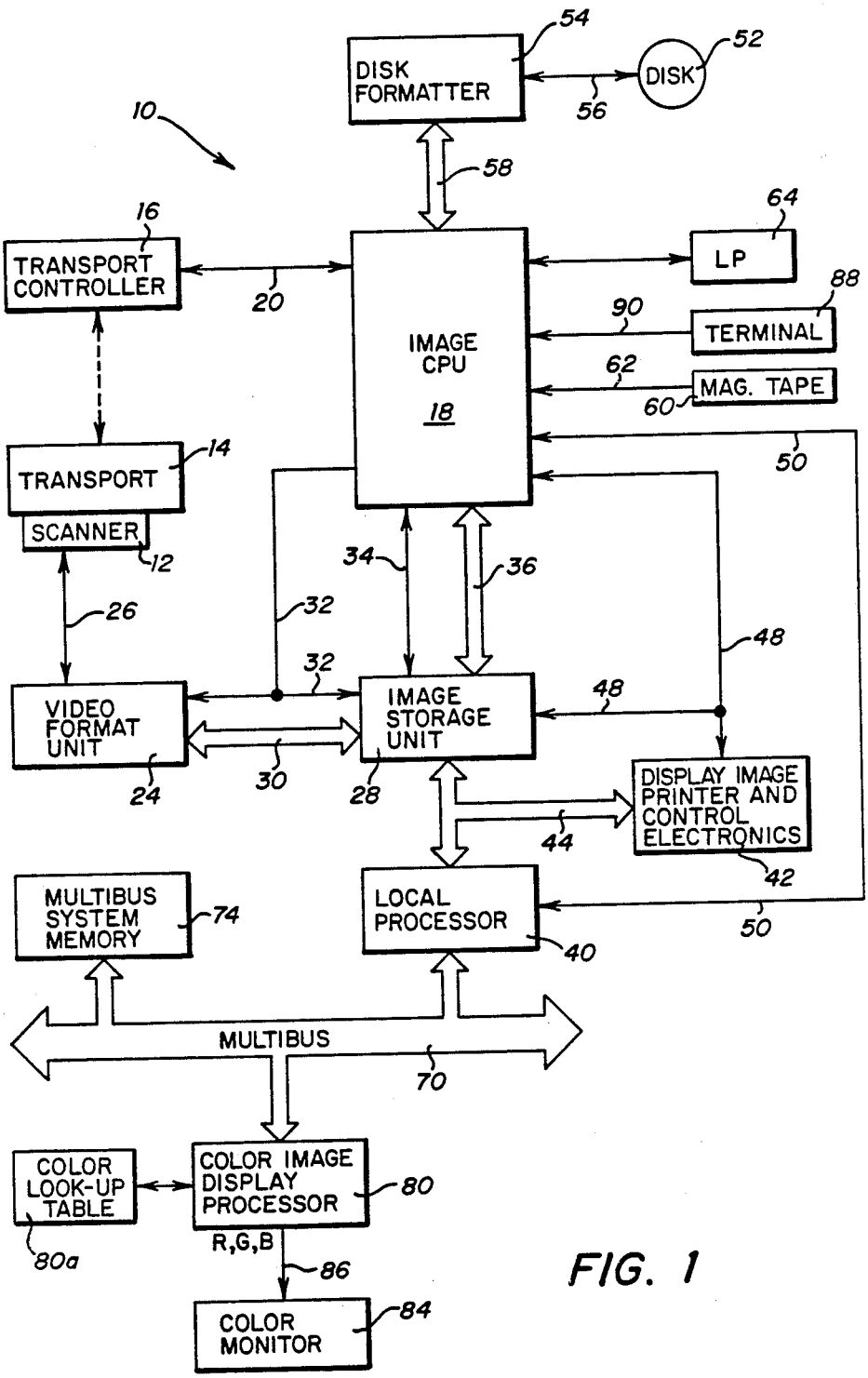
FIG. 1 is a functional block diagram of the present image processing system.

Referring to FIG. 1, a block diagram of the present image processing system is illustrated, and is generally identified by the numeral 10. Image processing system 10 lifts or captures the full face images of a document or a partial image of a document using an image scanner unit 12 which is mounted to a transport 14. Transport 14 allows documents to move past scanner unit 12 at a rate of, for example, 400 inches per second and at a document throughput rate of up to, for example 2000 documents per minute. Scanner unit 12 may include, for example, a CCD self-scanned array.

Scanner unit 12 may respond to light in the visible, infrared, X-ray or ultraviolet spectrum and preferably responds according to the human eye or photopic response. Each sample point provides a signal proportional to the reflectivity of the document at such point. Scanner unit 12 may provide resolution of 100 or more points per inch and may include electronic filtering to suppress broad backgrounds while enhancing short-spatial-duration reflectivity changes in the information contained in the document.

Transport 14 is controlled by a transport controller 16 which is controlled through operation of an image central processing unit 18 via a signal line 20.

The output of scanner unit 12 is raw video data in the form of energy levels or shades of gray which is applied to a video format unit 24 via a signal line 26. Video format unit 24 functions to process the video scan data to enhance the gray level image of the subject document, and then compress the filtered data to conserve storage disk space among other purposes. Video format unit 24 may comprise, for example, a Laplacian edge enhancement filter. The output of video format unit 24 is applied to an image storage unit 28 via a bus 30.

Access to image storage unit 28 is supplied by image CPU 18 which performs synchronization for the entire image processing system, including for example, subsequent processing of documents, subsequent reading, encoding, microfilming, displaying and printing. Communication between image CPU 18 and video format unit 24 and image storage unit 28 is carried out via signal lines 32 and 34 in addition to a bus 36.

Image storage unit 28 provides storage and retrieval capabilities for a large number of document images as they are captured on transport 14. Typically, one group of images is captured and then retained on a disk unit within image storage unit 28 during the system file and directory processing phase. During image printing, when required, image storage unit 28 receives from image CPU 18 a list of image identifiers, it then retrieves the referenced images for output to a local processor 40 and/or a display image printer and control electronics 42 via a bus 44.

Image CPU 18 provides overall control for image storage unit 28 and display image printer and control electronics 42 via a signal line 48. Control between local processor 40 and image CPU 18 is provided by a signal line 50.

Image processing system 10 includes a system disk 52 and a disk formatter 54 connected via a signal line 56. System disk 52 provides system software, application software and various files and directories built and maintained by the software during operation of the present image processing system 10 for use by image CPU 18 via a bus 58. Image processing system 10 also includes a magnetic tape system 60 communicating with image central processing unit 18 via a signal line 62 for inputting externally generated print control file data to image central processing unit 18. Also associated with image central processing unit 18 is a line printer 64.

Local processor 40 may comprise, for example, a 8086 microprocessor which provides a gray scale image of the document to a multibus interface 70 which may comprise, for example, an IEEE-796 multibus. Associated with multibus interface 70 is a multibus system memory 74 and a color image display processor 80. Color image display processor 80, may comprise, for example, a processor manufactured and sold by Matrox Electronics Systems, Ltd. of Quebec, Canada. Color image display processor 80 may comprise, for example, a Model GXB-1000A manufactured by Matrox. Color image display processor 80 includes an intelligent display processor, multiple on-board central processing units, highlevel graphic firmware, all the necessary video timing and control circuitry and a color look-up table 80*a*. Further, color image display processor 80 includes an image frame buffer and comprises a graphics processor which executes its own instruction set.

Color image display processor 80 functions to assign a unique color for a particular level of gray scale data of the image received from local processor 40. The output of color image display processor 80 is applied to a color monitor 84 via red, green and blue (R, G, B) signal lines 86 for display to the operator of the document image scanned by scanner unit 12. The various levels of information having a particular gray scale level data therefore are displayed as having a particular color. The operator of image processing system 10 therefore can view on color monitor 84 the various levels of information such that each level has an associated color. The operator therefore can better distinguish between layers of information because the color display provides contrast between the layers that is perceivable by the eye of the operator.

The associated color on the image display on color monitor 84 or printed by printer 42 may not in fact be the natural color on the document or images contained on the document but can be selected by the image processing system 10 operator by selecting a particular color look-up table through the use of a terminal 88 interconnected to image CPU 18 via signal line 90. The operator may also select a particular color look-up table for a specific portion of the document, such that multiple tables are used for the same document to maximize readability of data on the document. Color table information is transmitted from image CPU 18 to local processor 40 via signal line 50 for use by color image display processor 80. A pseudocolor image of the document can also be obtained by operation of display image printer and control electronics 42 to obtain a hard copy of the pseudocolor image of the document using printer 42.

Figure 2:
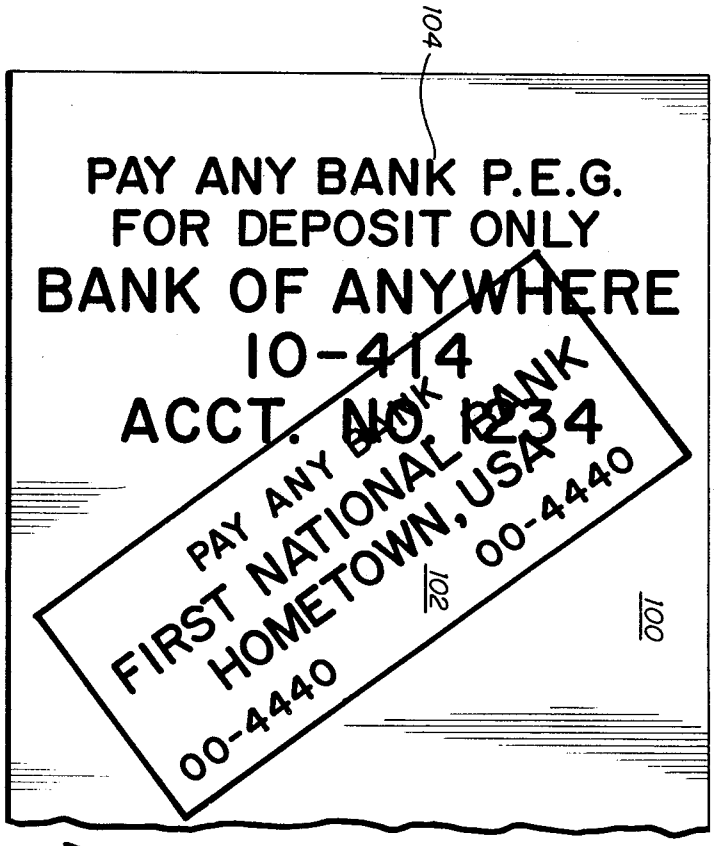
FIG. 2 is an illustration of a back of a check including endorsements.

Referring now to FIG. 2, the present image processing system 10 can be used, but is not limited to, for the processing of images contained on bank checks. FIG. 2 illustrates a portion of the back of a check 100 having endorsements or bank stamps 102 and 104. These endorsements are important for tracing processing paths of checks through bank handling of checks. Although the back of check 100 is shown, the present system 10 can also be used for processing images contained on the front of a bank check. Each endorsement 102 and 104 represents an image contained on check 100. It can be seen that endorsements 102 and 104 overlap and form levels of information. The overlap of endorsements 102 and 104 makes it difficult to determine information, such as the number of the account and words which form part of the endorsement.

Figure 3:
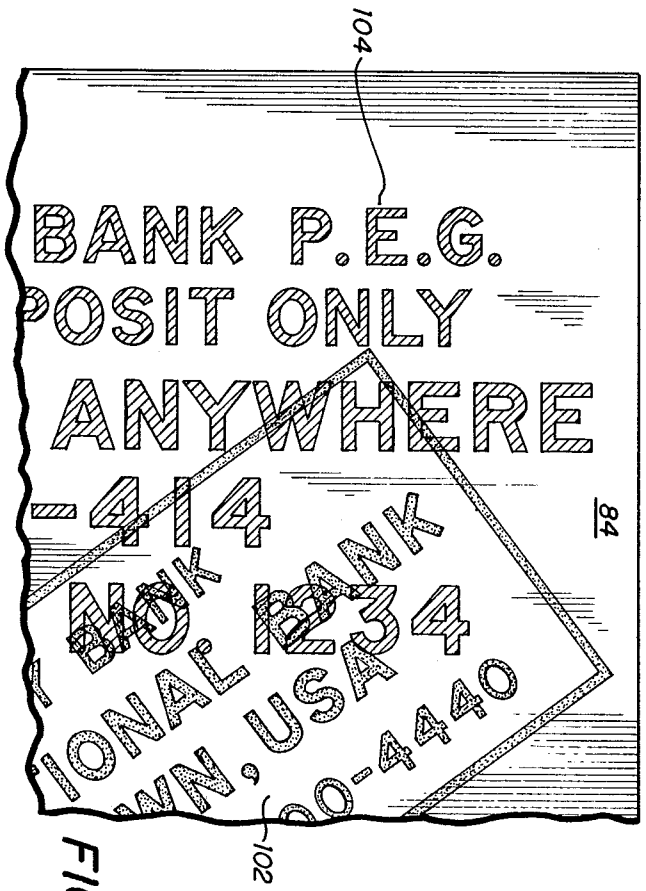
FIG. 3 illustrates an image of the check of FIG. 2 snown to represent a pseudocolor image.

FIG. 3 illustrates a representation of a pseudocolor image of endorsements 102 and 104, slightly enlarged, that would appear on color monitor 84. Endorsement 102 has been stippled to indicate one color and endorsement 104 has been hatched to indicate a second color. It can be seen that there is a contrast between the two images of endorsements 102 and 104, such that information that could not be identified or easily read by viewing the back of check 100 (FIG. 2) can now be distinguished. The color associated with the pseudocolor image of endorsements 102 and 104 may be selected by the operator using terminal 88 to select a particular color look-up table, such that the maximum contrast between the images of endorsements 102 and 104 can be obtained.

It therefore can be seen that the present image processing system 10 captures an image of a document, such as for example, a bank check and through gray scale processing enhances the images found on the document followed by utilizing a color look-up table to produce a pseudocolor image of the document to be displayed or printed. The color look-up table may also be used for assigning gray, black and white to the gray level data values of the images of the document in addition to actual colors to thereby enhance a gray scale image of the document.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. An image processing system for displaying to an operator a video image of a bank check or portion thereof, comprising:

means for scanning the bank check and for generating pixel signals representing gray level data values of the endorsements found on the bank check;

means for assigning a color data value to pixels having a predetermined gray level data value;

means for displaying said pixels having said assigned color data value for generating color images of endorsements found on the bank check to thereby assist an operator in distinguishing between multiple endorsements found on the bank check; and means selected by the operator for assigning a different color data value to pixels having said predetermined gray level data value when the operator is unable to distinguish between multiple endorsements found on the bank check and means for displaying said pixels having said different color data value.

2. The image processing system of claim 1 and further including means for printing said color image of the endorsements found on the bank check.

3. The image processing system of claim 1 wherein said endorsements are located on the front or back of the bank check.

4. A method for image processing of a video image of a bank check or portion thereof comprising the steps of:

scanning the bank check;

generating pixel signals representing gray level data values of the endorsements found on the bank check;

assigning a color data value to pixels having a predetermined gray level data value;

displaying the pixels having the assigned color data value to thereby generate color images of endorsements found on the bank check to allow an operator to distinguish between multiple endorsements found on the bank check;

assigning a different color data value to pixels having the predetermined gray level data value under control of an operator when the operator is unable to distinguish between multiple endorsements found on the bank check; and displaying the pixels having the different color data value.

* * * * *